Feb. 23, 1926.   
E. P. BULLARD, JR   
1,574,727

MULTIPLE SPINDLE CONTINUOUS DRILLING MACHINE

Filed March 23, 1921   3 Sheets-Sheet 1

INVENTOR.

Edward P. Bullard, Jr.

Feb. 23, 1926. 1,574,727
E. P. BULLARD, JR
MULTIPLE SPINDLE CONTINUOUS DRILLING MACHINE
Filed March 23, 1921   3 Sheets-Sheet 2

INVENTOR.
Edward P. Bullard, Jr.
By Chamberlain & Newman
Attys.

Feb. 23, 1926.
E. P. BULLARD, JR
1,574,727
MULTIPLE SPINDLE CONTINUOUS DRILLING MACHINE
Filed March 23, 1921   3 Sheets-Sheet 3

INVENTOR
Edward P. Bullard, Jr.
BY
Chamberlain & Newman
Attys

Patented Feb. 23, 1926.

1,574,727

UNITED STATES PATENT OFFICE.

EDWARD P. BULLARD, JR., OF BRIDGEPORT, CONNECTICUT, ASSIGNOR TO THE BULLARD MACHINE TOOL CO., OF BRIDGEPORT, CONNECTICUT, A CORPORATION OF CONNECTICUT.

MULTIPLE-SPINDLE CONTINUOUS-DRILLING MACHINE.

Application filed March 23, 1921. Serial No. 454,741.

*To all whom it may concern:*

Be it known that EDWARD P. BULLARD, Jr., a citizen of the United States, and resident of Bridgeport, in the county of Fairfield and State of Connecticut, has invented certain new and useful Improvements in Multiple-Spindle Continuous-Drilling Machines, of which the following is a specification.

My present invention relates to improvements in automatic machine tools, for small boring, reaming and turning operations, employing a series of spindles and a rotary work carrier upon which a number of pieces of work may be held while being operated upon.

The invention particularly relates to that class of metal working machines wherein the work is held stationary and the cutters rotate and continuously operate from start to the finish of an operation. Further to provide a rotary carrier upon which the work and cutter spindles are mounted, in a manner to be carried therewith, and to provide means whereby the respective pieces of work when placed in the respective fixtures or holders upon the table of the carrier will be continuously operated upon by the rotary cutting tools and so as to be completed within a single rotation of the carrier upon which the pieces of work are positioned beneath the tool carrying spindles.

The object of the present invention is to provide a rapid production machine for reproducing similar pieces of work, requiring drilling, boring, reaming or external cylindrical operations of like nature. To provide for loading and unloading the machine from any one or more positions, designated as the loading station, by a single operator positioned adjacent thereto, and whereby the work when positioned on the machine, will be carried away from the operator and around the machine and brought back to the operator completed. Further to provide means whereby the cutting tool will be gradually and continuously fed forward from the beginning to near the completion of each turn of the table, and further to design and time the machine so that as each spindle and its tools are brought back to the loading station, the operation upon its particular piece of work will have been completed, and the tools automatically withdrawn to permit the work to be removed from the table and if desired replaced thereon beneath and adjacent of cutting tool while the carrier is still rotating.

The invention further resides and consists in the construction and novel combination and arrangement of parts hereinafter more fully described, illustrated in the accompanying drawings, and pointed out in the claims hereto appended, it being understood that various changes in the form, proportion, size and minor details of construction within the scope of the claims may be resorted to without departure from the spirit or sacrificing any of the advantages of the invention.

Like characters of reference denote corresponding parts throughout the several figures of the accompanying drawings forming a part of this specification, and upon which, Fig. 1 is a front elevation of my improved form of automatic multiple spindle drilling machine complete.

Figure 1:
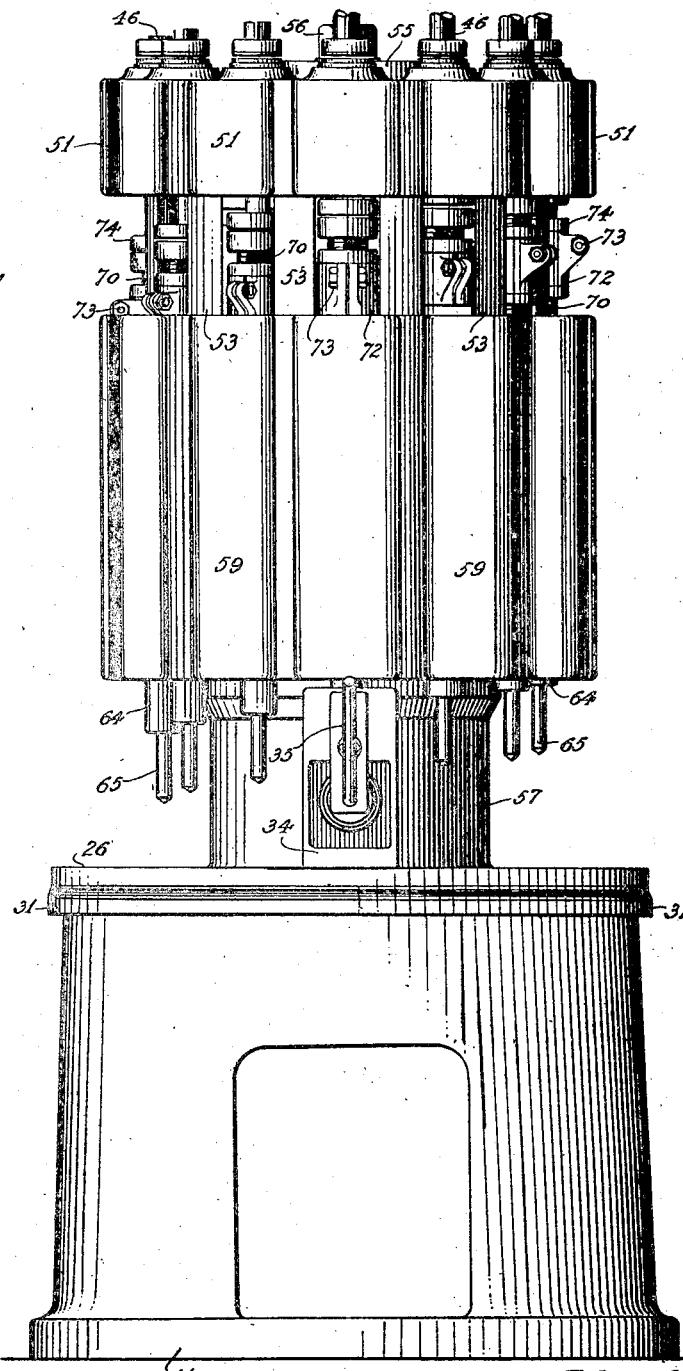

Of the characters of reference marked upon the drawings, 10 represents a motor positioned in the base 11 of the machine. This base is of a general cylindrical form, and is provided with an opening 12 to receive a chip container 13. The motor is fitted to drive the wheel 14 upon shaft 15 mounted in bearing 16 of the base and carrying a smaller belt wheel 17 connected with a second belt wheel 18 upon a short shaft 19 mounted in a bearing 20 of the base of the machine. Upon the shaft 19 is secured a gear 21 that meshes with and drives a similar gear 22 upon the shaft 23 carrying a worm 24 which serves to engage and drive the large worm wheel 25 secured to the lower portion of the rotary carrier 26.

The lower part of the base 11 serves to support and inclose the operating mechanism already described. It further includes an annular bearing 27 including a raceway in which are ball bearings 28 engaged by a similar race 29 of the carrier. The upper annular edge portion of the base is provided with an inwardly disposed flange 30 over which the annular apron 31 of the carrier 26 extends. A cylindrical column 32 extends up central from the base to support additional fixed and operative members of the machine as will be described.

Figure 2:
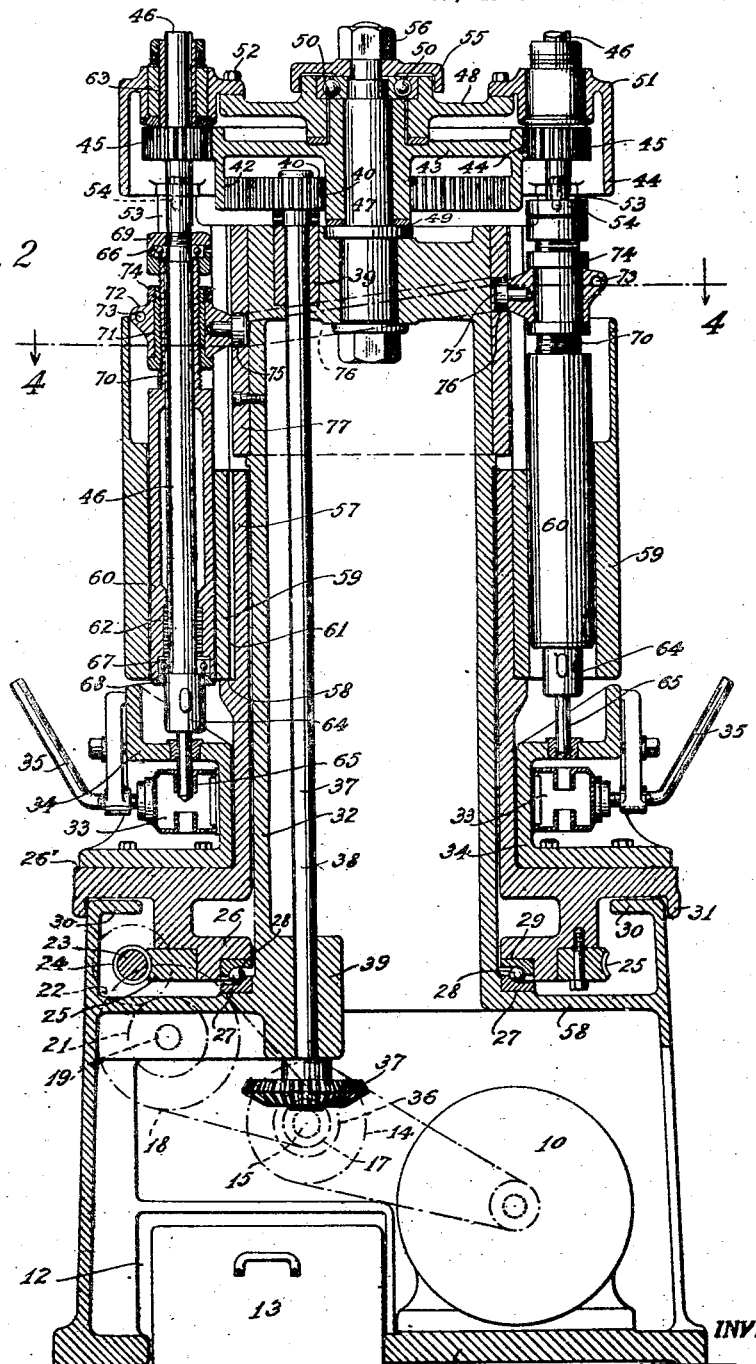
Fig. 2 is a central vertical cross sectional view taken on line 2—2 of Fig. 4.
Figure 3:
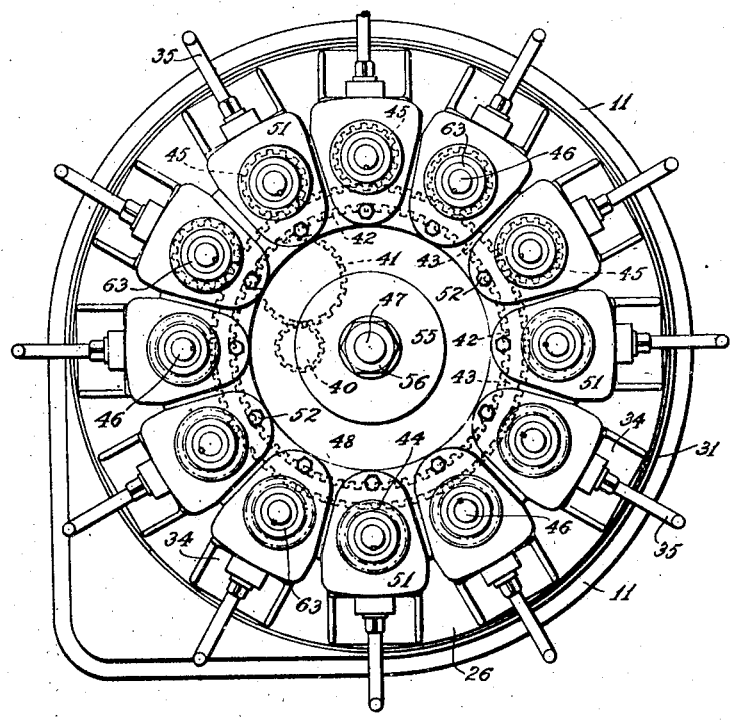
Fig. 3 shows a top plan view of the complete machine.

The work piece 33 to be operated on by this machine may be secured to the table 26' of the carrier in any desired or preferred manner depending somewhat upon the nature of the piece and the operations required to be performed. As illustrated, I have shown in Figs. 2 and 3 suitable fixtures or workholders designated as 34 in which the work piece 33 is supported, the latter being detachably secured therein by means of clamping screw 35. The particular piece of work shown in the drawing represents a motor piston, and the operation being performed is that of drilling a hole therethrough to receive the customary wrist-pin employed in pistons of this character. Upon the inner end of the intermediate shaft 15 is mounted a beveled pinion 36 that meshes with and drives a gear 37 upon a vertical shaft 38 mounted in the upper and lower bearings 39 of the base and column. Upon the upper end of this shaft 38 is mounted a pinion 40 which engages an idler 41 that drives the internal gear 42 of a double face gear 43 and whose outer gear section 44 meshes with and simultaneously drives each of the gears 45 upon the several tool spindles 46.

This inner and outer face gear 43 is mounted upon a central stud 47 secured in the enclosed top end portion of the column in a manner to not only support the stud for the said double face gear, but to form a bearing around which the covering member 48 of the carrier rotates. 49 indicates a thrust bearing for this covering of the carrier and 50 represents a ball bearing encircling the stud on which the top cover operates. This covering also serves for the attachment of the several spindle supports 51 in which the spindles 46 are journaled, the said parts 48 and 51 being secured together by screw bolts 52. These supports are further secured on upwardly disposed posts 53 of the carrier and secured thereto in any suitable manner as for instance by means of screw bolts 54 as shown. A dust cap 55 is employed to inclose the hub of the covering 48 and the ball bearings 50 and is secured to the reduced end of the stud by means of a nut 56.

Figure 4:
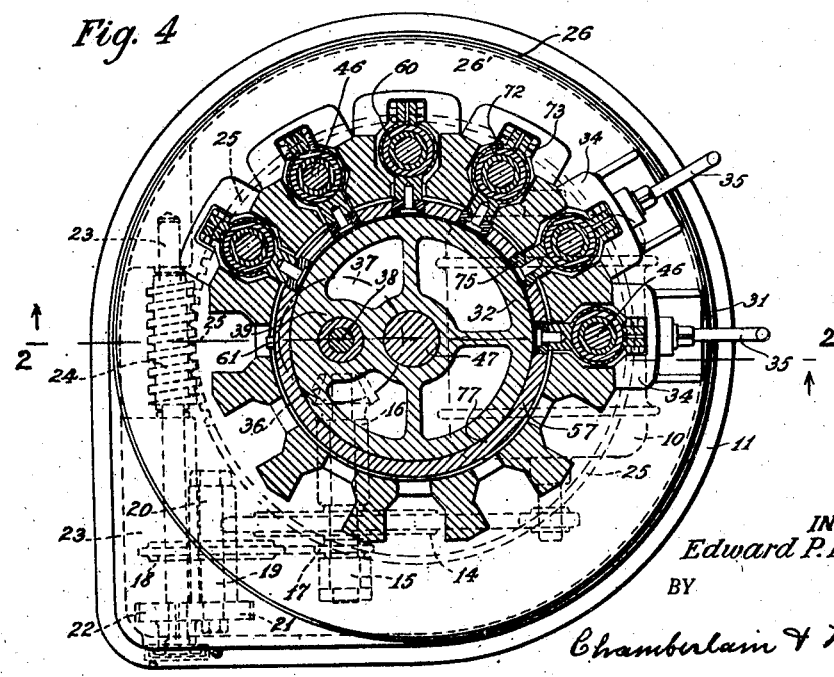
Fig. 4 shows a sectional plan view taken on line 4—4 of Fig. 2, some of the spindles and spindle bearings being removed.

In addition to the annular table 26', the carrier includes a cylindrical body portion 57, which freely encircles the column 32 of the base and provided with an annular shoulder 58 upon which the annular support 59 for the spindle bearings 60 are mounted. Said support closely encircles the cylindrical portion of the carrier and is secured thereto by means of keys 61 shown in Figs. 2 and 4. The support is provided with a series of vertical sockets 62 to receive the longitudinally movable spindle bearings 60 in which the driven spindles 46 rotate. In the drawings I have shown a series of twelve of these bearings 60 and spindles, though it will be obvious that a greater or less number may be employed according to the size of machine required. They are all alike in construction and are similarly supported and connected for operation, therefore I will use like reference characters to denote the same parts in the several sets. The spindles are rotatably mounted in the bearings and each has a gear 45 splined to its upper end for rotating the shaft in a way which will also permit the spindle to be moved longitudinally through the said gear during its feeding and return movements, without disturbing the relation of the spindle gears with the large driving gears 44.

In addition to the longitudinally movable spindle bearings 60 provided for the spindles, it will also be seen that the upper ends of these spindles are also rotatably and slidably supported as at 63 in the spindle support 51 before referred to, of the carrier. A suitable chuck 64 is provided upon the lower ends of the spindles to hold the reamers or other tools 65. The spindle bearings are provided with an upper ball bearing 66 and a lower ball bearing 67 having suitable enclosing caps 68 and 69 respectively. The spindle bearings each include an upper reduced threaded portion 70 to which a sleeve 71 is threadably attached. A split collar 72 is clamped to this sleeve by a screw 73 and is further secured by a nut 74. These fixed collars carry a roll 75 that engages the cam groove 76 in the cylindrical cam member 77 secured to the upper end of column 32, whereby vertical reciprocatory movement is imparted to the spindle bearings and spindles with the turning of the carrier and bearing support secured thereon. The shape of the cam groove is such as to gradually feed the spindles down during the major portion of the rotation of the carrier and to include a quick return and a short non-feeding movement for the remainder of the rotation of the carrier. The short non-feeding movement of the spindles causes them to carry forward in a horizontal plane so as to obviously permit the finished work to be removed and the new piece of work to be fixed to the table of the carrier while the carrier and the spindles are still rotating. The operation of the machine is substantially as follows:

The motor 10 when started serves to drive the intermediate shaft 15 and its connecting shaft 38 which in turn operates the double face gear 43 that drives the several spindle gears 45 all of which are simultaneously and continuously rotated during the running of the motor.

The intermediate shaft 15 is further connected to drive the short shaft 19 which is geared to drive the worm shaft and worm in a way to continuously operate the carrier including its work table upon which the several fixtures are arranged for securing the work to be operated upon by the rotary cutting tools carried in the chuck of the work spindles. In this connection it should be borne in mind that the several pieces of work including the fixtures for holding the same are carried around with the carrier together with the spindles also mounted upon the carrier so as to form a continuously operating machine, and each piece of work secured in the fixtures upon the table is properly aligned with the cutting tool of the spindles. The spindles thus serve to perform a complete operation with each turn of the carrier, and so that one piece of work is completed and taken from the machine for each spindle which it contains, with each rotation of the carrier. In addition to the rotary drive imparted to the drills, reamers or other cutting tools carried by the tool spindles, I also provide a vertical feeding movement of the spindles accomplished by mounting the rotary spindles in a longitudinally movable spindle bearing and then providing a holder in which the said spindle bearing and its spindle may be reciprocated through the engagement of a roll carried by each spindle-bearing with an annular cam groove encircling the upper part of the machine. This cam is of such a pitch as to simultaneously feed the respective spindles down and back with the travel of the spindles around the cam. The completed piece is removed from the fixture beneath each spindle at each rotation of the carrier, and when doing simple pieces requiring a few operations only, a large production can be accomplished with a single operator.

Having thus fully described the invention, what I claim and desire to secure by Letters Patent is:—

1. In a multiple spindle machine, a base, a hollow cylindrical support carried thereby and having a horizontally disposed head, a rotatable carrier surrounding said support annularly, means adapted to support work pieces in radially spaced relation, a plurality of radially spaced tool operating spindles carried by the carrier, tools therefor, and means for rotating the spindles comprising a non-rotatable vertical shaft carried by said head and extending above it, a spindle-driving gear journaled on said shaft and having two sets of teeth, a vertical drive shaft in said support at one side of said non-rotatable shaft, a gear on said drive shaft above said head adapted to drive said spindle-driving gear through cooperation with one of said sets of teeth, and gears carried by said spindles and meshing with the other set of teeth.

2. In a multiple spindle machine, a base, a support carried thereby and having a horizontally disposed head, a rotatable carrier surrounding said support annularly, means adapted to support work pieces in radially spaced relation, a plurality of radially spaced tool operating spindles carried by the carrier, tools therefor, and means for rotating the spindles comprising a spindle driving gear journaled on said head and having an internal and an external series of teeth, a vertical drive shaft in said support and having a gear meshing with the inner set of teeth of said spindle driving gear, gears carried by said spindles and meshing with the outer set of teeth, and means carried by said cylindrical support adapted to cause reciprocation of said spindles.

3. In a multiple spindle machine, a base, a support carried by said base, and having a horizontally disposed head, and a rotatable carrier surrounding said support annularly, means adapted to support work pieces in radially spaced relation, a plurality of radially spaced tool operating spindles carried by said carrier, tools therefor, and means for rotating the spindles comprising a non-rotatable vertical shaft carried by said head and extending above it, a spindle drive gear journaled on said shaft and having two sets of teeth, drive means at one side of said non-rotatable shaft, adapted to drive said spindle driving gear through cooperation with one of said sets of teeth, gears carried by said spindles and meshing with the other set of teeth and means carried by said cylindrical support adapted to cause reciprocation of said spindles.

4. In a multiple spindle machine, a base, a hollow cylindrical support carried thereby and having a horizontally disposed head, a rotatable carrier surrounding said support annularly, means adapted to support work pieces in radially spaced relation, a plurality of radially spaced tool operating spindles carried by the carrier, tools therefor, and means for rotating the spindles comprising a non-rotatable vertical shaft carried by said head and extending above it, a spindle-driving gear journaled on said shaft and having two sets of teeth, a vertical drive shaft in said support at one side of said non-rotatable shaft, a gear on said drive shaft above said head adapted to drive said spindle-driving gear through cooperation with one of said sets of teeth, gears slidably keyed to said spindles and meshing with the other set of teeth, reciprocating sleeves in which the spindles are rotatable, rollers respectively provided on said sleeves, and a cam carried by said cylindrical support engaged by said rollers and adapted to reciprocate said sleeves and spindles.

5. In a multiple spindle machine, a base, a hollow cylindrical support carried thereby and having a horizontally disposed head, a rotatable carrier surrounding said support annularly, means adapted to support work pieces in radially spaced relation, a plurality of radially spaced tool operating spindles carried by said carrier, tools therefor, and means for rotating the spindles comprising a non-rotatable vertical shaft carried by said head and extending above it, a spindle driving gear journaled on said shaft and having an annular cylindrical skirt portion, provided at the outer side and adjacent the upper edge thereof with one set of teeth, and at the inner side and adjacent the lower edge thereof with another set of teeth, a vertical drive shaft in said support at one side of said non-rotatable shaft, a gear on said drive shaft above said head adapted to drive said spindle-driving gear through cooperation with said inner set of teeth, and gears carried by said spindles and meshing with said outer set of teeth.

6. In a multiple spindle machine, a base, a hollow cylindrical support carried thereby and having a horizontally disposed head, a rotatable carrier surrounding said support annularly, means adapted to support work pieces in radially spaced relation, a plurality of radially spaced tool operating spindles carried by the carrier, tools therefor, and means for rotating the spindles comprising a non-rotatable vertical shaft carried by said head and extending above it, a spindle-driving gear journaled on said shaft and having two sets of teeth, a vertical drive shaft in said support at one side of said non-rotatable shaft, a gear on said drive shaft above said head adapted to drive said spindle-driving gear through cooperation with one of said sets of teeth, gears carried by said spindles and meshing with the other set of teeth, a rotatable cover journaled upon the upper end of said non-rotatable shaft, radially disposed bearings in said cover journalling said last-mentioned gears and said spindles, and an annular skirt portion on said cover surrounding said last-mentioned gears annularly.

Signed at Bridgeport, in the county of Fairfield and State of Connecticut, this 18th day of March A. D. 1921.

EDWARD P. BULLARD, Jr.